United States Patent [19]

Moschgat

[11] 4,186,387
[45] Jan. 29, 1980

[54] ULTRASONIC PEST REPELLENT METHOD AND SYSTEM

[75] Inventor: Robert G. Moschgat, North Stonington, Conn.

[73] Assignee: Micro-Sonics, Inc., Scarsdale, N.Y.

[21] Appl. No.: 840,061

[22] Filed: Oct. 11, 1977

Related U.S. Application Data

[63] Continuation-in-part of Ser. No. 738,807, Nov. 4, 1976, abandoned.

[51] Int. Cl.² .............................................. G08B 3/10
[52] U.S. Cl. ............................ 340/384 E; 340/384 R
[58] Field of Search .............. 340/384 R, 384 E, 15 R

[56] References Cited

U.S. PATENT DOCUMENTS

| | | | |
|---|---|---|---|
| 3,636,559 | 1/1972 | Del Grande | 340/384 E |
| 3,872,472 | 3/1975 | Moschgat | 340/384 E |
| 3,873,960 | 3/1975 | Gates | 340/384 E |

*Primary Examiner*—Harold I. Pitts
*Attorney, Agent, or Firm*—Sprung, Felfe, Horn, Lynch & Kramer

[57] ABSTRACT

A method of and system for sonifying a portion of a given area to rid the area of unwanted pests comprising providing at least one ultrasonic point source each producing a set of pulsed signals having a randomly varying frequency in the range of about 18-30 KHz and having an intensity of at least 90 dB at the periphery of a cone shaped area extending outwardly therefrom and having a predetermined maximum length and a predetermined maximum width. The point sources are spaced in the given area to maintain the minimum sound intensity level at any point in the sonified portion at not less than 90 dB by disposing point sources opposite one another when the distance therebetween is greater the maximum length, disposing point sources adjacent one another to effect a longitudinal overlapping of adjacent cones when the room width is greater than the maximum width and disposing point sources perpendicular to the adjacent point sources to sonify any dead space therebetween.

8 Claims, 3 Drawing Figures

ULTRASONIC PEST REPELLENT METHOD AND SYSTEM

REFERENCE TO RELATED APPLICATION

This application is a continuation in part of application Ser. No. 738,807 filed on Nov. 4, 1976, and now abandoned.

BACKGROUND AND SUMMARY OF THE INVENTION

This invention relates generally to a pest repellent system and, more particularly, pertains to a system and method for efficiently sonifying and ridding an area of unwanted pests.

Noxious pests such as rats or mice have long caused havoc in many places because of the harm such pests cause to property. More importantly, these pests are disease carriers and a hazardous situation is created if such pests are permitted to occupy the same area as humans.

Many techniques have been employed to rid such areas of unwanted pests. The most common is to set out rat poison. However, this technique has obvious drawbacks.

Another technique presently gaining widespread popularity is one in which an area is sonified by blanketing it with ultrasonic signals that are above the human range of hearing and to which the pests are sensitive. Normally, this is in the range of 18 KHz to 30 KHz. It has been determined that some pests are sensitive only to frequencies at the low end of the range while other pests are sensitive to frequencies at the high end. However, the stated range of frequencies is required so that most unwanted pests, such as rats, pigeons, insects, etc., will be affected.

It has been found that the most efficient type of transducer for such a system is a piezoelectric device. However, these devices have extremely limited bandwidth and a single transducer is ineffective to produce signals over the entire bandwidth under consideration.

As noted more fully in my U.S. Pat. No. 3,872,472, if pests are exposed to ultrasonic energy of predetermined frequency for prolonged periods, they eventually become immune to the sound and they reappear. Even variable frequency signals that are regular with time become ineffectual after a period of time. That is, the rodents are able to accommodate themselves to such regular frequency variations.

In practice, it has been found that a minimal intensity level of sound is required to effectively eliminate rodents from an infested area. In other words, for maximum efficiency and effectiveness, the intensity of the sound at any point within the area to be treated should not fall below a minimum level.

It is thus the main object of the present invention to provide an improved ultrasonic pest repellent method and system which overcomes the disadvantages of the prior art methods and systems by providing ultrasonic point sources which produce pulse signals having a randomly varying frequency in the range of about 18 to 30 kilohertz and spacing the point sources in a given area to maintain the minimum sound intensity level at any point in the sonified portion at not less than 90 dB.

BRIEF DESCRIPTION OF THE DRAWINGS

Other features and advantages of the present invention will become obvious from a consideration of the following detailed description, when taken in conjunction with the accompanying drawings, in which.

DETAILED DESCRIPTION OF THE INVENTION

As noted hereinabove, an ultrasonic pest repellent system constructed according to the present invention produces sound waves or signals that lie in a band above the human range of hearing and to which the pests are sensitive. It has been determined, particularly where rodents are concerned, that an effective band of frequencies for use in such system extends from 18 KHz to 30 KHz. Moreover, in order to maintain the required sound level intensities, as noted in greater detail below, it is highly desirable to utilize piezoelectric transducers as sonic point sources to convert the electrical energy into sound energy. However, an inherent characteristic of such piezoelectric devices is their narrow response curve. That is, these devices are normally very sharply tuned. However, the system of the present invention utilizes such piezoelectric transducers to provide a highly efficient device, while at the same time producing signals over the aforenoted bandwidth to effectively drive pests from the infested area.

Figure 1:
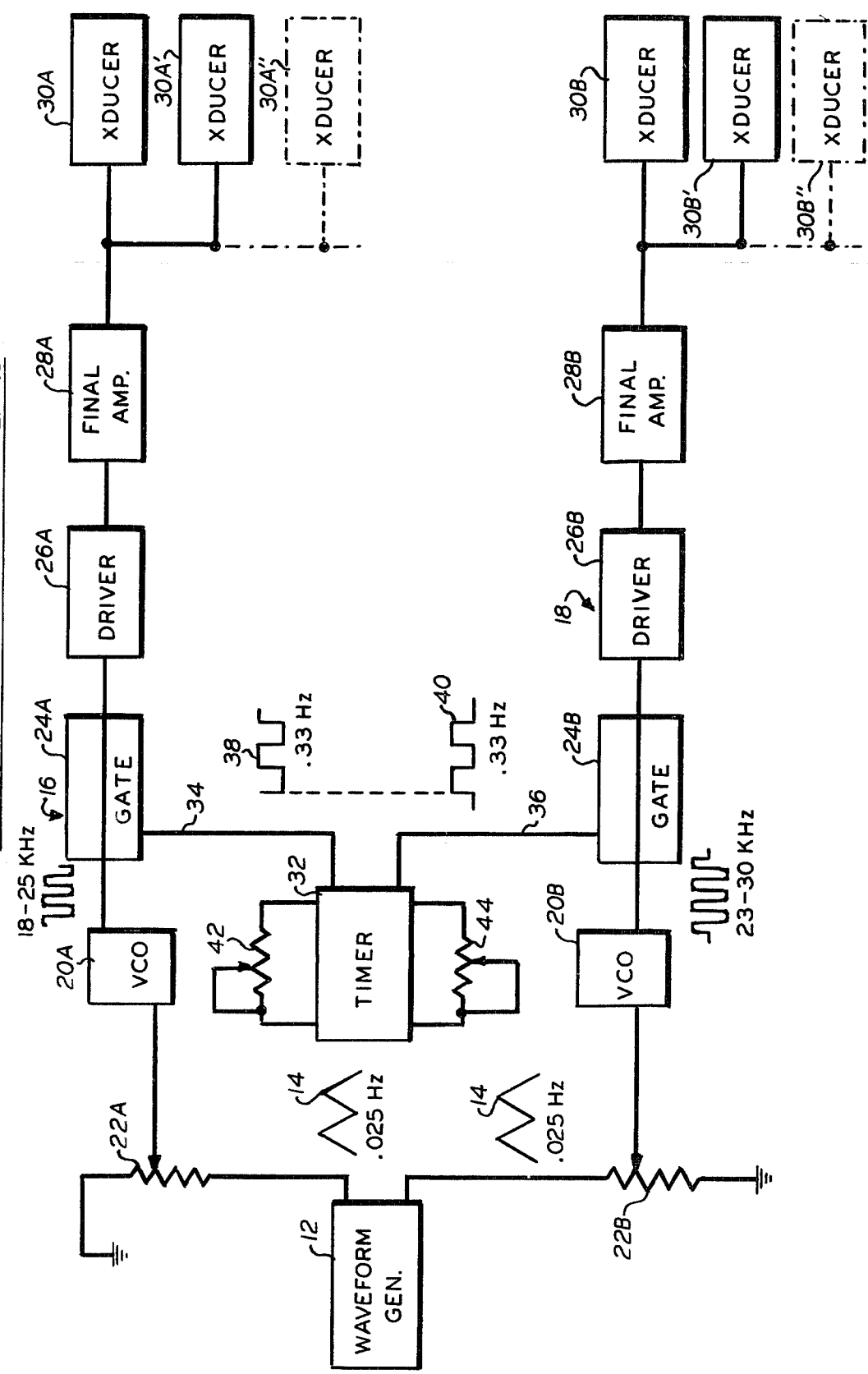
FIG. 1 is a schematic circuit wiring diagram, in block form, of a pest repellent sonic system constructed according to the present invention.

More specifically, a pest repellent sonic system constructed according to the present invention is shown in FIG. 1 and designated generally by the reference character 10. The system includes a wave form generator 12 that produces a triangular waveform, which is indicated generally at 14. The output terminals of the generator 12 are connected to two channels respectively designated 16 and 18. The elements in each channel are identical and the same elements are designated by the same numerical prefix but with a different letter suffix. Thus, those elements in channel 16 will be designated by an "A" suffix, while those elements in channel 18 will be designated by a "B" suffix. Only one channel will be described, it being understood that the other channel operates in the same manner, expect for the noted differences.

More specifically, the output terminals of the waveform generator 12 are connected to the input terminals of a voltage controlled oscillator 20A through the sliding arm of a potentiometer 22A. The other end of the potentiometer is connected to ground. The output terminals of the voltage controlled oscillator 20A are connected to the input terminals of a gate 24A, the output terminals of which are connected to a driver amplifier 26A. The driver amplifier drives a final amplifier 28A which, in turn, applies the signal to transducers 30A, 30A', 30A" ... etc., for each of the point sources used in the system. The voltage controlled oscillator is conventional in construction and produces a signal whose frequency varies as a function of the voltage applied to the input terminals. The gates 24A and 24B are controlled by a timer 32 via the respective leads 34 and 36. The timer 32 is operable to produce a pulse train on the lead 34 as indicated by the pulse train 38 in FIG. 1. Similarly, the timer 32 is operable to produce a pulse train on the lead 36 similar to the pulse train 40 in FIG. 1. It will be noted that the train 38 is inversely related to the train 40. That is, when the train 40 goes positive, the train 38 goes negative. Similarly, when the train 38 goes positive, the train 40 goes negative. In other words, the frequencies of the trains 38 and 40 are equal to each other, but the trains are inversely related. The frequency of the trains 38 and 40 may be varied by adjusting potentiometers 42 and 44 which are associated with the timer 32. For example, the timer may comprise a 556 timer which generates two square wave outputs. The gates 24A and 24B are conventional in construction and are operable to connect the output terminals of the associated voltage controlled oscillator to the input terminals of the associated driver when a positive control signal is applied to the gate via the respective leads 34 and 36. In other words, when a positive signal is applied to the lead 34, the signal generated by the voltage controlled oscillator 20A will be applied to the driver 26A through the gate 24A and, therefore, to the transducers 30A, 30A'. . . . On the other hand, when the signal on the lead 34 is negative, the gate 24A effectively blocks the signal from the oscillator 20A from reaching the driver 26A.

It will now become apparent that the signals from the timer 32 cause each channel to produce signals intermittently and alternately. That is, when the transducers 30A, 30A' . . . are energized, the transducers 30B, 30B', 30B'' . . . are deenergized. On the other hand, when signals are applied to the transducers 30B, 30B' . . . , no signals are applied to the transducers 30A, 30A' . . . .

In operation, the parameters of each channel are chosen so that the voltage controlled oscillator in a particular channel will produce only a portion of the overall bandwidth. Moreover, the transducer associated with that channel is tuned to a frequency in the bandwidth associated with the particular channel. As a result, the sharply tuned piezoelectric transducers may be utilized in an efficient and effective manner. Although only two channels have been shown and described herein, this is for illustrative purposes only and not to be interpreted as being a limitation on the present invention. That is, additional channels may be utilized and each channel will thereupon produce a smaller overall portion of the bandwidth under consideration.

The particular bandwidth of frequencies produced by the oscillator in a channel will be determined by the setting of the potentiometer, such as potentiometer 22A. That is, since the frequency of the oscillator is dependent upon the input potential, the setting of the potentiometer will determine the magnitude of the level of voltage that will be applied to the oscillator.

In an actual embodiment, the potentiometer 22A was adjusted so that the voltage controlled oscillator 20A produced frequencies having a bandwidth of 18 KHz–25 KHz, preferably 20–25 KHz. The transducers 30A, 30A', 30A'' . . . each comprise a TR 89B #21 Piezoelectric Device, manufactured by the MASSA Div. of Dynamics Corporation of America, Hingham, Massachusetts. This device was tuned to a frequency of 21.5 KHz±2 KHz. On the other hand, the potentiometer 22B was adjusted so that the voltage controlled oscillator 20B produced a band of frequencies of 23 KHz–30 KHz preferably 23–29 KHz. The transducers 30B, 30B', 30B'', . . . each comprise a TR 89B #24 Piezoelectric Device, manufactured by MASSA. This device was tuned to 24.5 KHz±2 KHz.

As noted hereinabove, the gates conduct intermittently so that the transducers produce bursts or pulses of sound. Since a triangular waveform is applied to the voltage controlled oscillator in each channel, the frequency of the sound produced by the transducer will vary as a function of the variation in voltage applied to the voltage controlled oscillator at the opening of the gate and the closing of the associated gate. Thus, the frequency of the sound will vary during each pulse. Additionally, the frequency of the pulse trains 38 and 40 are selected to be greater than the frequency of the waveforms 14, and out of synchronization with the waveforms 14. In practice the frequency of waveforms 14 is about 0.025 Hz while the frequency of pulse trains 38 and 40 are about 0.33 Hz. Thus, each gate in a channel will open at a different point on the waveforms 14. As a result, the frequencies of the sound produced by the respective transducers will vary in a random manner from cycle to cycle or pulse to pulse. This will prevent the rodents from accommodating themselves to frequency variations that are regular with time. Additionally, the alternate switching from channel to channel causes the frequencies emitted by the system to vary abruptly as each channel is energized, thereby producing further discontinuities in the frequency variations.

In an actual installation, it was found that a minimum level of intensity was required for efficient and effectual operation of the device. Thus, utilizing the pest repellent sonic system 10, it was determined that a minimum sound level of 90 dB was required at every point in the area to be treated. In other words, although the sound intensity level could be greater than the minimum level, nonetheless the minimum level was required.

Figure 2:
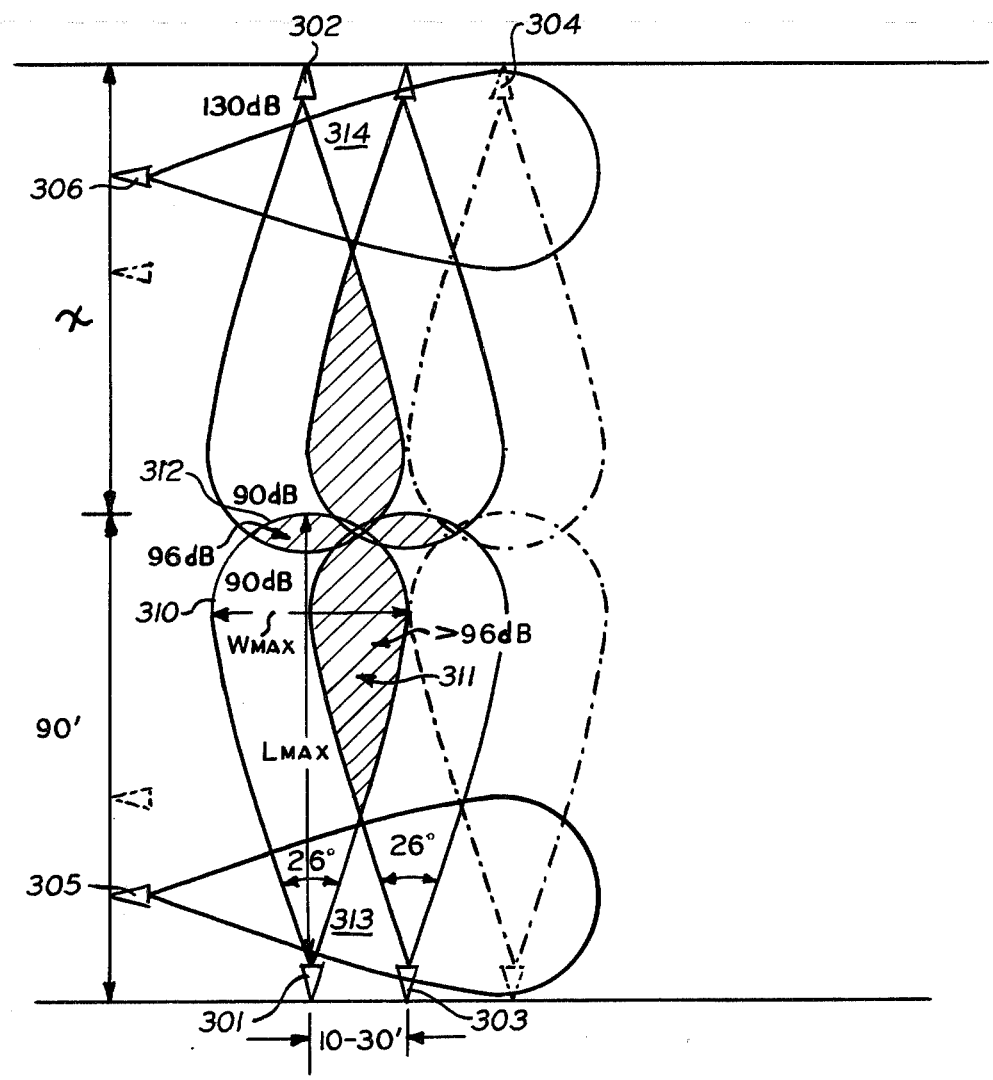
FIG. 2 is a schematic view of the sound output of the system of FIG. 1.

In order to maintain the minimum sound intensity level of 90 dB at any point in the sonified portion of an area, the point sources are spaced in the given area as shown in FIG. 2. As a result of the characteristics of the transducers used, the point source will emit sound having an intensity of at least 90 dB in a cone shaped area 310 extending outwardly from the point source and having a predetermined maximum length Lmax and a predetermined maximum width Wmax. For a point source intensity of 130 dB, the predetermined maximum length is approximately 90 feet and the predetermined maximum width is approximately 30 feet with an angle at the base of the cone of about 26°. This characteristic of the point source is due to its physical limitations and the attenuation due to spreading and propagation loss which is calculated as follows:

$$S\ max - 20 \log 10\ R$$

where R is the distance from the point source in yards.

In order to maintain the minimum sound intensity level, point sources are disposed opposite one another such as pairs 301, 302 and 303, 304 when the distance between the pairs is greater than the maximum length of the cone. Additionally, the point sources are disposed adjacent to one another such as pairs 301, 303 and 302, 304 when the room width is greater than the maximum width. Lastly, point sources 305, 306 are disposed perpendicular to adjacent point sources 301, 303 and 302, 304 respectively to sonify any dead space such as areas 313 and 314 therebetween.

In order to maintain the average or mean intensity level of the sonified area to be approximately 100 to 110 dB, it is preferable to effect overlapping of opposite and adjacent cones. As shown, cones for opposite point sources 301 and 302 overlap at area 312 whereby the sound intensity level for both cones which is at approximately 90 dB will add and equal at least 96 dB therein. Adjacent point sources 301 and 303 also have their cones overlapping in area 311 which is preferably equal to up to one half of the maximum width of the cone and in the overlapping area 311, the minimum intensity level due to the summing of the two signals is at least 96 dB.

Figure 3:
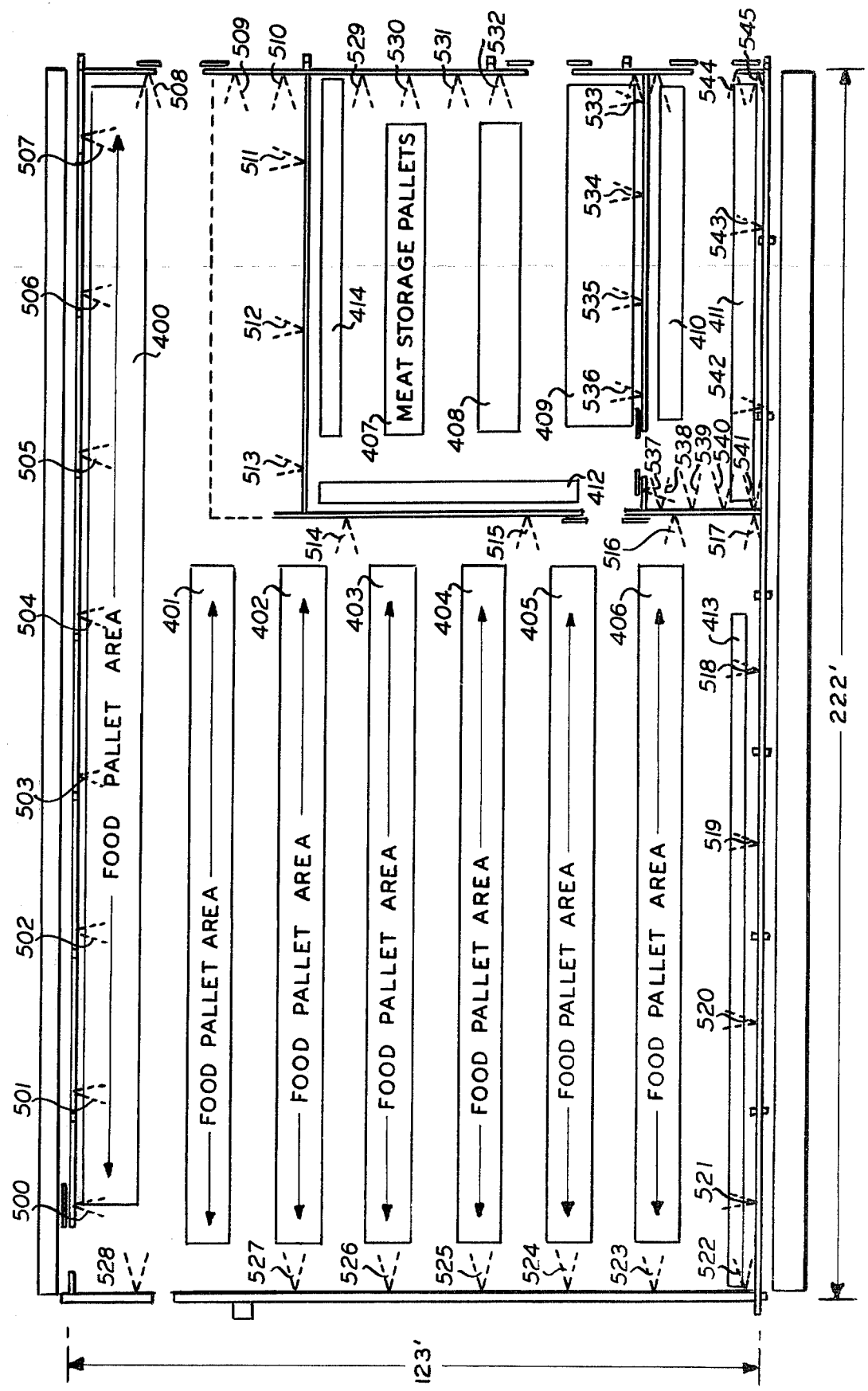
FIG. 3 is a diagrammatic view of a room utilizing the system of FIG. 1 to sonify a portion thereof to remove pests from the infested area.

FIG. 3 is an example of the use of the system and method of the present invention in a food storage environment. Areas 400–414 represent food pallet storage areas and triangles 500–545 represent the ultrasonic point sources spaced around the area to sonify a portion of the area to rid the entire area of unwanted pests. As a result of the placement of the point sources, consistent with the characteristics thereof described with respect to FIG. 2, a desired portion of the area as shown in FIG. 3 is sonified, whereby the pests are driven from the entire area. The spacing of the point sources 500–545 is consistent with the situation of walls and other obstructions in the area.

While preferred embodiments of the invention have been shown and described herein, it will become obvious that numerous omissions, changes and additions may be made in such embodiments without departing from the spirit and scope of the present invention.

What is claimed is:

1. A method of sonifying a portion of a given area having a given maximum longitudinal dimension and a lateral dimension to rid the area of unwanted pests comprising:
   a. providing a plurality of ultrasonic point sources each producing a set of pulsed signals having a randomly varying frequency in the range of about 18–30 KHz and having a cone shaped 90 dB intensity waveform extending outwardly therefrom having a predetermined maximum length more than half the given maximum longitudinal dimension of the given area and a predetermined maximum width, each point source effecting this output by producing a first set of ultrasonic pulsed signals having a randomly varying frequency in the range of about 18–25 KHz and a second set of ultrasonic pulsed signals having a randomly varying frequency in the range of about 23–30 KHz and alternately enabling said first and second signals by providing first and second signal channels generating a randomly varying frequency signal in each channel corresponding in frequency to said first and second signals, gating the two channels to alternately enable one and then the other and providing a set of first and second transducers for each point source and applying the signals from the first and second channels to the first and second transducers, respectively, of all the point sources; and
   b. sonifying the given area to an intensity level of not less than 90 dB by disposing at least two groups of two longitudinally opposing sets of transducers along the lateral dimension of the area to effect overlapping of the cone shaped waveforms at the ends thereof with adjacent sets of transducers having the distance therebetween less than the maximum width to effect an overlapping of adjacent cones and disposing at least two sets of transducers along the longitudinal dimension to provide a waveform perpendicular to that of the adjacent sets of transducers along the lateral dimension to sonify any dead space therebetween.

2. A system for sonifying a portion of a given area having a given maximum longitudinal dimension and a lateral dimension to rid the area of unwanted pests comprising:
   a. a plurality of ultrasonic point sources each for producing a set of pulsed signals having a randomly varying frequency in the range of about 18–30 KHz and having a cone shaped 90 dB intensity waveform extending outwardly therefrom having a predetermined maximum length more than half the given longitudinal dimension of the given area and a predetermined maximum width each point source comprising means for producing a first set of ultrasonic pulsed signals having a randomly varying frequency in the range of about 18–25 KHz and a second set of ultrasonic pulsed signals having a randomly varying frequency in the range of about 23–30 KHz and for alternately enabling said first and second signals including first and second signal channels for generating a randomly varying frequency signal in each channel corresponding in frequency to said first and second signals means for gating the two channels to alternately enable one and then the other, a set of first and second transducers for each point source and means for applying the signals from the first and second channels to the first and second transducers, respectively, of all the point sources; and
   b. means for sonifying the given area to an intensity level not less than 90 dB comprising means fixing at least two groups of two longitudinally opposing sets of transducers along the lateral dimension of the area to effect overlapping of the cone shaped waveforms at the ends thereof with adjacent sets of transducers having the distance therebetween less than the maximum width to effect an overlapping of adjacent cones and fixing at least two sets of transducers along the longitudinal dimension to provide a waveform perpendicular to that of the adjacent sets of transducers along the lateral dimension to sonify any dead space therebetween.

3. The method according to claim 1, wherein the first signal has a frequency range of about 20–25 KHz and the second signal has a frequency range of about 23–29 KHz.

4. The method according to claim 1, wherein each point source has an intensity level of at least 130 dB and the maximum length is 90' and the maximum width is 30'.

5. The method according to claim 1, wherein adjacent point sources are spaced to effect overlapping of up to one half of the maximum width.

6. The system according to claim 2, wherein the first signal has a frequency range of about 20–25 KHz and the second signal has a frequency range of about 23–29 KHz.

7. The system according to claim 2, wherein each point source has an intensity level of at least 130 dB and the maximum length is 90' and the maximum width is 30'.

8. The system according to claim 2, wherein adjacent point sources are spaced to effect overlapping of up to one half of the maximum width.

* * * * *